United States Patent
Murray et al.

(10) Patent No.: US 11,753,341 B2
(45) Date of Patent: Sep. 12, 2023

(54) ENGINEERED STONE PRODUCT AND METHODS OF MAKING THE SAME

(71) Applicants: MFLGH INC., LaGrange, GA (US); FUJIAN ULTRACERA NEW MATERIALS CO., LTD., Fujian (CN)

(72) Inventors: Richard Scott Murray, Santa Fe, NM (US); Wangbao Wu, Shanghai (CN)

(73) Assignees: MFLGH INC., LaGrange, GA (US); FUJIAN ULTRACERA NEW MATERIALS CO., LTD., Fujian (CN)

( * ) Notice: Subject to any disclaimer, the term of this patent is extended or adjusted under 35 U.S.C. 154(b) by 276 days.

(21) Appl. No.: 17/297,448

(22) PCT Filed: Dec. 12, 2018

(86) PCT No.: PCT/CN2018/120687
§ 371 (c)(1),
(2) Date: May 26, 2021

(87) PCT Pub. No.: WO2020/118572
PCT Pub. Date: Jun. 18, 2020

(65) Prior Publication Data
US 2022/0017417 A1   Jan. 20, 2022

(51) Int. Cl.
| | | |
|---|---|---|
| C04B 26/18 | (2006.01) |
| C04B 26/14 | (2006.01) |
| C04B 26/06 | (2006.01) |
| C04B 14/22 | (2006.01) |
| C04B 14/04 | (2006.01) |
| C04B 111/54 | (2006.01) |

(52) U.S. Cl.
CPC ............ *C04B 26/18* (2013.01); *C04B 14/041* (2013.01); *C04B 14/22* (2013.01); *C04B 26/06* (2013.01); *C04B 26/14* (2013.01); *C04B 2111/54* (2013.01)

(58) Field of Classification Search
None
See application file for complete search history.

(56) References Cited

U.S. PATENT DOCUMENTS

| | | | |
|---|---|---|---|
| 9,090,509 B2 * | 7/2015 | Ramon Moreno | ..... C04B 26/18 |
| 2007/0244222 A1 | 10/2007 | Ghahary et al. | |
| 2008/0296795 A1 | 12/2008 | Willis-Papi | |
| 2018/0179110 A1 | 6/2018 | Lee et al. | |

FOREIGN PATENT DOCUMENTS

| | | | |
|---|---|---|---|
| CN | 101138859 A | * | 3/2008 |
| CN | 101328039 A | | 12/2008 |
| CN | 103204659 A | | 7/2013 |
| CN | 103833265 A | | 6/2014 |
| CN | 106116260 A | | 11/2016 |
| CN | 106866084 A | | 6/2017 |

(Continued)

OTHER PUBLICATIONS

Brochure for Kaolin by PubChem, 1 page, Downloaded on Apr. 30, 2023.*

(Continued)

*Primary Examiner* — Tae H Yoon
(74) *Attorney, Agent, or Firm* — NKL Law; Allen Xue

(57) ABSTRACT

An engineered stone product is made using a material that includes ceramic powder, glass sand, and a binder.

21 Claims, 1 Drawing Sheet

(56) References Cited

FOREIGN PATENT DOCUMENTS

| | | |
|---|---|---|
| CN | 107344823 A | 11/2017 |
| CN | 107555907 A | 1/2018 |
| CN | 107814511 A | 3/2018 |
| CN | 101323131 A | 12/2018 |
| EP | 2927199 A1 * | 10/2015 |
| JP | 02255552 A * | 10/1990 |
| KR | 20180079154 A | 7/2018 |

OTHER PUBLICATIONS

Brochures for Spinel by Gemstone Dictionary, 3 pages, Downloaded on Apr. 30, 2023.*
Spinel: Mineral information by Mindt.org, 4 pages, Downloaded on Apr. 30, 2023.*

* cited by examiner

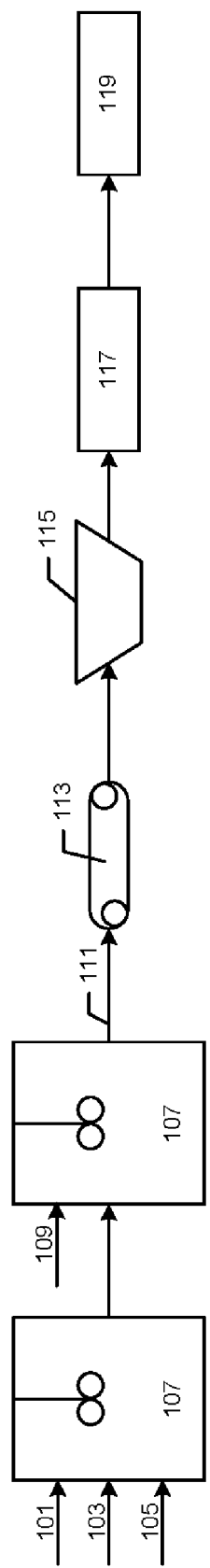

ENGINEERED STONE PRODUCT AND METHODS OF MAKING THE SAME

CROSS-REFERENCE TO RELATED APPLICATIONS

This application is the national phase entry of International Patent Application No. PCT/CN2018/120687, filed on Dec. 12, 2018, the content of each is incorporated herein by reference in its entirety.

FIELD OF THE DISCLOSURE

This disclosure relates to engineered stone products and methods, specifically to ceramic-based engineered stone products and methods.

BACKGROUND

Engineered stone products are used for a variety of purposes including countertops, flooring, furniture surfaces, building decorative panels, wall tiles, and the like. Many engineered stone products are manufactured using quartz sands as their main component, and have gained consumer favor because they can be less porous and more durable than certain naturally occurring stone materials, but can achieve similar aesthetic properties.

However, engineered stone products which use quartz sands as their main component still suffer from several drawbacks. For example, they are produced having a limited glossy sheen, colors may fade out or bleed from the engineered stone, and they are often unsuitable for outdoor use. Further, the performance of engineered stone products which use quartz sands as their main component is often limited by the quality of the quartz sands, which are a naturally-occurring material. Accordingly, the quality of quartz sands is variable, and the quantity of quartz sands available is decreasing over time.

Accordingly, improved engineered stone products are needed.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

In one aspect, an engineered stone product is provided including ceramic powder, glass sand, and a binder.

In another aspect, a method of making an engineered stone product is provided including mixing ceramic powder, glass sand, and a binder to form a mixture; compressing the mixture to form a compressed mixture, for example by vibration compression; and curing the compressed mixture to form the engineered stone product.

BRIEF DESCRIPTION OF THE DRAWINGS

The following figures illustrate embodiments of the subject matter disclosed herein. The claimed subject matter may be understood by reference to the following description taken in conjunction with the accompanying figures, in which like reference numerals identify like elements, and in which:

FIG. 1 is a schematic illustration of a method of making an engineered stone product according to an aspect of the present disclosure.

DETAILED DESCRIPTION

Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular. For example, if a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate aspects, may also be provided in combination in a single aspect. Conversely, various features of the invention that are, for brevity, described in the context of a single aspect, may also be provided separately or in any subcombination.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus.

As used herein, the terms "sand" and "powder" are intended to refer to a particulate solid having an average particle size of from about 10 nm to about 5 mm, including any ranges therebetween.

Engineered stone products and methods of making the same have been developed. These engineered stone products may be suitable for a number of uses, including as countertops, sinks, flooring, and the like. Surprisingly, it has been discovered that engineered stone products can be manufactured using ceramic powders, and that these stone products may exhibit superior aesthetic and physical properties compared to those of engineered stone products made using quartz sands as a major component.

In some aspects, engineered stone products are provided which include ceramic powder, glass sand, and a binder. In some aspects, methods of making an engineered stone product are provided including mixing ceramic powder, glass sand, and a binder to form a mixture; compressing the mixture to form a compressed mixture; and curing the compressed mixture to form the engineered stone product.

In some aspects, compressing the mixture to form a compressed mixture includes vibration compression. For example, in some aspects, the vibration compression occurs under vacuum conditions, for example at a pressure of about −0.1 MPa. In some aspects, the compressed mixture is cured at a temperature of from about 85° C. to about 110° C., for example about 85° C., about 90° C., about 95° C., about 100° C., about 105° C., about 110° C., or any ranges there between.

In some aspects the ceramic powder includes an aluminium silicate. For example, in some aspects, the ceramic powder includes kaolinite ($Al_2Si_2O_5(OH)_4$), metakaolin ($Al_2Si_2O_7$), spinel ($MgAl_2O_4$), garnet ($X_3Al_2Si_3O_{12}$, where X is selected from $Fe^{2+}$, $Ca^{2+}$, $Mg^{2+}$, and $Mn^{2+}$) or any combinations thereof. In some aspects, the ceramic powder comprises from about 0.5 wt. % to about 30 wt. % aluminum, for example from about 3 wt. % to about 10 wt. % aluminum, for example about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, or any ranges there between.

In some aspects, the ceramic powder is present in the engineered stone product in an amount of from about 3 wt. % to about 90 wt. %, for example from about 30 wt. % to about 80 wt. %, for example about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or any ranges there between.

In some aspects, the ceramic powders have an average particle size of from about 8 mesh to about 600 mesh, for example about 8 mesh, about 10 mesh, about 50 mesh, about 100 mesh, about 150 mesh, about 200 mesh, about 250 mesh, about 300 mesh, about 350 mesh, about 400 mesh, about 450 mesh, about 500 mesh, about 550 mesh, about 600 mesh, or any ranges there between.

In some aspects, the glass sand includes a silicate. For example, in some aspects the silicate includes from about 0.5 wt. % to about 10 wt. % calcium and from about 0.5 wt. % to about 10 wt. % sodium. For example, in some aspects the silicate includes aluminum in an amount of about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, or any ranges there between. In some aspects, the silicate includes calcium in an amount of about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, or any ranges there between. In some aspects, the glass sand does not include quartz. In some aspects, the glass sand contains less than 5 wt. % quartz, for example 4 wt. %, 3 wt. %, 2 wt. %, 1 wt. %, 0.5 wt. %, or less.

In some aspects, the glass sand has an average particle size of from about 5 mesh to about 600 mesh, for example from about 5 mesh to about 150 mesh. For example, in some aspects the glass sand has an average particle size of about 5 mesh, about 10 mesh, about 50 mesh, about 100 mesh, about 150 mesh, about 200 mesh, about 250 mesh, about 300 mesh, about 350 mesh, about 400 mesh, about 450 mesh, about 500 mesh, about 550 mesh, about 600 mesh, or any ranges there between.

In some aspects, the glass sand is present in the engineered stone product in an amount of from about 0.5 wt. % to about 30 wt. %, for example about 0.5 wt. %, about 1 wt. %, about 1.5 wt. %, about 2 wt. %, about 5 wt. %, about 10 wt. %, about 15 wt. %, about 20 wt. %, about 25 wt. %, about 30 wt. %, or any ranges there between. In some aspects, the glass sand is present in the engineered stone product an amount of from about 10 wt. % to about 50 wt. %, for example about 10 wt. %, about 15 wt. %, about 20 wt. %, about 25 wt. %, about 30 wt. %, about 35 wt. %, about 40 wt. %, about 45 wt. %, about 50 wt. %, or any ranges there between.

Without intending to be bound by any particular theory, it is believed that the relative amounts of ceramic powder and glass sands present in the engineered stone product can be adjusted to adjust the physical performance of the engineered stone product.

In some aspects, the binder includes a resin. For example, in some aspects, the binder includes an alkyd resin, such as an unsaturated polyester resin, an epoxy resin, an acrylic resin, or any combination thereof. For example, in some aspects, the unsaturated alkyd resin is produced using phthalic acid as a raw material, and may contain one or more epoxy, hydroxyl, carboxyl, isocyanate, and amino groups. In some aspects, the resin may include a commercially-available resin, such as one or more ORCHEM™ resins available from Orson Chemicals. For example, in some aspects, the resin may include ORCHEM™ 707, a medium viscosity, low reactivity, non pre accelerated, non thixotropic, unsaturated polyester resin; ORCHEM™ 727, a UV stabilized, medium viscosity, low reactive, non pre accelerated, non thixotropic, unsaturated polyester resin. In some aspects, the resin may include SIMILAR® resins available from Interplastic Corporation, such as SIL93BE-956, an acrylic modified (MMA) NPG-isophthalic resin with UV inhibitors. In some aspects, the resin may include Breton type polyester resins available from Turkuaz Polyester. In some aspects, the resin may include Polaris™ unsaturated polyester resins available from Ashland. In some aspects, the binder is present in the engineered stone product in an amount of from about 1 wt. % to about 25 wt. %, for example from about 7 wt. % to about 15 wt. %. For example, in some aspects, the binder is present in the engineered stone product in an amount of about 1 wt. %, about 5 wt. %, about 7 wt. %, about 10 wt. %, about 15 wt. %, about 20 wt. %, about 25 wt. %, or any range there between.

In some aspects, the engineered stone product further includes one or more decorative additives. The decorative additives may include one or more coloring pigments, reflective material, or aggregates. For example, coloring pigments may include coloring or whitening agents such as titanium dioxide ($TiO_2$), iron oxide pigments, phthalocyanine blue pigments, pearlescent pigments, azo pigments, mirror chips, and mixtures thereof.

In some aspects, the engineered stone product does not contain any quartz sands. In some aspects, the engineered stone product contains trace amounts of quartz sands as a decorative additive. For example, in some aspects the engineered stone product contains less than 5 wt. % quartz sands, for example 4 wt. %, 3 wt. %, 2 wt. %, 1 wt. %, 0.5 wt. %, or less.

In some aspects, the engineered stone product has a Mohs hardness of 5 or more. For example, in some aspects, the engineered stone product has a Mohs hardness of from about 5 to about 8, for example about 5, about 5.5, about 6, about 6.5, about 7, about 7.5, about 8, or any ranges there between.

In some aspects the engineered stone product may be polished to a glossiness of at least 20°. For example, in some aspects, the engineered stone product may be polished to a glossiness of from about 40° to about 70°, for example about 40°, about 45°, about 50°, about 55°, about 60°, about 65°, about 70°, or any ranges there between. In some aspects, the engineered stone product may be honed to a glossiness of less than about 10°, for example about 9°, about 8°, about 7°, about 6°, about 5°, about 4°, about 3°, about 2°, about 1°, about 0°, or any ranges there between. In some aspects, the glossiness is measured by ASTM D523.

In some aspects, the engineered stone product has a water absorption of less than 0.03% when measured by ASTM C97/C97M-18.

In some aspects, the engineered stone product has a density of from about 2000 kg/m3 to about 3500 kg/m3, for example about 2000 kg/m$^3$, about 2500 kg/m$^3$, about 3000 kg/m$^3$, about 3500 kg/m$^3$, or any ranges there between.

In some aspects, the engineered stone product has an abrasion resistance of greater than about 36 when measured by ASTM C241/C241M-15. In some aspects, the engineered stone product has an abrasion resistance of from about 20 to about 90, when measured by ASTM C241/C241M-15, for example about 20, about 25, about 30, about 35, about 40, about 45, about 50, about 55, about 60, about 65, about 70, about 75, about 80, about 85, about 90, or any ranges there between.

In some aspects, the engineered stone product has a modulus of rupture greater than about 30 MPa. In some aspects, the engineered stone product has a modulus of rupture of from about 30 MPa to about 100 MPa, for example from about 32 MPa to about 70 MPa. For example, in some aspects, the engineered stone product has a modulus of rupture of about 30 MPa, about 32 MPa, about 35 MPa, about 40 MPA, about 45 MPa, about 48 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, or any ranges there between, when measured by ASTM C99/C99M-15.

In some aspects, the engineered stone product has a flexural strength of greater than about 25 MPa. In some aspects, the engineered stone product has a flexural strength of from about 26 MPa to about 100 MPa, for example about 26 MPa, about 30 MPa, about 35 MPa, about 40 Mpa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, or any ranges there between, when measured by ASTM C880/C880M-15.

In some aspects, the engineered the stone product is not affected by chemical substances according to ASTM C650-04. In some aspects, the engineered stone product passes ASTM C241-15 for stain resistance.

EXAMPLES

Embodiments of the present disclosure may be better understood by reference to the following examples.

Example 1: Engineered Stone Product Composition

Four mixtures were prepared, each including 25 wt. % ceramic powder, 64.5 wt. % glass sand, 10 wt. % resin, and trace amounts (0.5 wt. %) of coloring or whitening agents.

The compositions of the ceramic powders used in these mixtures are shown in Table 1 below:

TABLE 1

| Ceramic Powder Compositions | | | | |
|---|---|---|---|---|
| Mixture No. | Sodium | Aluminum | Silicon | Oxygen |
| 1 | 1.21 wt. % | 13.54 wt. % | 16.84 wt. % | 68.41 wt. % |
| 2 | 1.23 wt. % | 18.16 wt. % | 16.29 wt. % | 64.32 wt. % |
| 3 | 1.19 wt. % | 22.93 wt. % | 15.68 wt. % | 60.20 wt. % |
| 4 | 1.24 wt. % | 28.11 wt. % | 14.72 wt. % | 55.93 wt. % |

Each of the ceramic powders used in mixtures 1-4 had an average particle size of between about 8 mesh and 600 mesh.

The compositions of the glass sands used in these mixtures are shown in Table 2 below:

TABLE 2

| Glass Sands Compositions | | | | | | |
|---|---|---|---|---|---|---|
| Mixture No. | Sodium | Magnesium | Aluminum | Silicon | Calcium | Oxygen |
| 1 | 8.86 wt. % | 2.10 wt. % | 1.10 wt. % | 27.85 wt. % | 4.61 wt. % | 55.24 wt. % |
| 2 | 8.82 wt. % | 2.15 wt. % | 5.8 wt. % | 27.82 wt. % | 4.63 wt. % | 50.78 wt. % |
| 3 | 8.85 wt. % | 2.08 wt. % | 10.5 wt. % | 28.06 wt. % | 4.59 wt. % | 45.92 wt. % |
| 4 | 8.87 wt. % | 2.13 wt. % | 15.6 wt. % | 27.74 wt. % | 4.60 wt. % | 41.06 wt. % |

Each of the glass sands used in mixtures 1-4 had an average particle size of between about 6 mesh and 120 mesh. The particle size distribution of the glass sands was measured using a RO-TAP® machine, commercially available from W.S. Tyler, and is shown in Table 3 below:

TABLE 3

| Particle Size Distribution of Glass Sand | |
|---|---|
| Particle Size | Wt. % of Engineered Stone Product Which is Glass Sand in this Particle Size Range |
| 6-8 mesh | 5 |
| 8-16 mesh | 8.5 |

TABLE 3-continued

Particle Size Distribution of Glass Sand

| Particle Size | Wt. % of Engineered Stone Product Which is Glass Sand in this Particle Size Range |
|---|---|
| 16-30 mesh | 13 |
| 30-60 mesh | 15 |
| 40-70 mesh | 12 |
| 70-120 mesh | 11 |

The resin used in each of mixtures 1-4 was an unsaturated alkyd resin made using phthalic acid. The resin used in mixtures 2-4 further included up to 50% high active groups, such as cross-linking moieties, or groups which polymerize a resin and initiator. The coloring and whitening agents included titanium dioxide ($TiO_2$), iron oxide, phthalocyanine blue, pearlescent pigment, and azo pigments.

Example 2: Method of Making an Engineered Stone Product

Each of the mixtures of Example 1 were used to create an engineered stone product. FIG. 1 is a schematic illustration of the method of making the engineered stone product. First, the ceramic powders 101, glass sands 103, and coloring and whitening agents 105 of Example 1 were mixed in a non-gravity mixer 107, specifically a XinYin XJ-1500 mixer at 3 minutes with normal machine speed to homogenize the mixture of these dry ingredients. Next, the resin 109 was added and mixed until a homogenous mixture was obtained, which occurred after 6 minutes of mixing in the XinYin XJ-1500 mixer at normal machine speed.

Next, the homogenous mixture 111 was moved through a conveyor belt 113 into a cloth car 115, and the cloth was placed into a cloth mold frame evenly by a cloth vehicle. Next, the cloth including the homogenous mixture was passed to a vacuum high-frequency vibration plate 117, where the cloth and homogenous mixture were pressed using vibration compression at a vacuum condition of about −0.1 MPa to form a compressed mixture.

Next, the compressed mixture was passed to a curing furnace 119, where it was cured by heating at a temperature of between 70° C. and 150° C. for 40 minutes to form an engineered stone product. The engineered stone product was then allowed to cool for 24 hours at ambient temperature, before undergoing additional finishing steps. Specifically, the engineered stone product was passed through thickening equipment to ensure that the product produced had a uniform thickness. Next, the engineered stone product was polished using a 20 head pass through polishing machine for water grinding and polishing. Next, the quality of the engineered stone product was inspected, and the product was cut to desired sizes using crosscutting and bridge cutting equipment. Finally, the cut product was air-dried for 1-2 minutes at ambient temperature, packed, and stored in the warehouse.

Example 3: Physical Characterization of Engineered Stone Product

Next, the engineered stone products of Example 2 were characterized to determine their physical properties. Specifically, the Mohs hardness, water absorption, density, abrasion resistance, modulus of rupture, flexural strength, resistance to chemical substance, and stain resistance of each engineered stone product was measured according to the methods shown in Table 4 below:

TABLE 4

Physical Characterization of Engineered Stone Product of Mixture No. 1

| Physical Property | Testing Method | Value |
|---|---|---|
| Mohs hardness | EN 15771-2010 | 5 |
| Water absorption | ASTM C97/C97M-18 | 0.03 wt. % |
| Density | ASTM C97/C97M-18 | 2500 kg/m³ |
| Abrasion resistance | ASTM C241/C241M-15 | 36 |
| Modulus of rupture | ASTM C99/C99M-15 | 48 |
| Flexural strength | ASTM C880C880M-15 | 40 MPa |
| Resistance to chemical substance | ASTM C650-04 | Not affected |
| Stain resistance | ASTM C241-15 | pass |

TABLE 5

Physical Characterization of Engineered Stone Product of Mixture No. 2

| Physical Property | Testing Method | Value |
|---|---|---|
| Mohs hardness | EN 15771-2010 | 6 |
| Water absorption | ASTM C97/C97M-18 | 0.03 wt. % |
| Density | ASTM C97/C97M-18 | 2420 kg/m³ |
| Abrasion resistance | ASTM C241/C241M-15 | 45 |
| Modulus of rupture | ASTM C99/C99M-15 | 62 Mpa |
| Flexural strength | ASTM C880C880M-15 | 60 MPa |
| Resistance to chemical substance | ASTM C650-04 | Not affected |
| Stain resistance | ASTM C241-15 | pass |

TABLE 6

Physical Characterization of Engineered Stone Product of Mixture No. 3

| Physical Property | Testing Method | Value |
|---|---|---|
| Mohs hardness | EN 15771-2010 | 7 |
| Water absorption | ASTM C97/C97M-18 | 0.02 wt. % |
| Density | ASTM C97/C97M-18 | 2450 kg/m³ |
| Abrasion resistance | ASTM C241/C241M-15 | 55 |
| Modulus of rupture | ASTM C99/C99M-15 | 68 Mpa |
| Flexural strength | ASTM C880C880M-15 | 65 MPa |
| Resistance to chemical substance | ASTM C650-04 | Not affected |
| Stain resistance | ASTM C241-15 | pass |

TABLE 7

Physical Characterization of Engineered Stone Product of Mixture No. 4

| Physical Property | Testing Method | Value |
|---|---|---|
| Mohs hardness | EN 15771-2010 | 8 |
| Water absorption | ASTM C97/C97M-18 | 0.02 wt. % |
| Density | ASTM C97/C97M-18 | 2500 kg/m³ |
| Abrasion resistance | ASTM C241/C241M-15 | 70 |
| Modulus of rupture | ASTM C99/C99M-15 | 72 Mpa |
| Flexural strength | ASTM C880C880M-15 | 70 MPa |
| Resistance to chemical substance | ASTM C650-04 | Not affected |
| Stain resistance | ASTM C241-15 | pass |

As can be seen from the results above, the engineered stone products of Example 2 surprisingly exhibit improved physical properties compared to engineered stone products which contain quartz as a main component, such as Caesarstone® products available from Caesarstone Ltd., Silestone® products available from Cosentino, S.A.U., or Cambria® products available from Cambria Company LLC. Moreover, the increased amount of aluminum included in the ceramic powders and glass sands of mixtures 2-4 compared to mixture 1, combined with the high active group content of the resins used in mixtures 2-4 appears to have resulted in even greater improvements to the modulus of rupture and flexural strength of the engineered stone materials made from mixtures 2-4.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An engineered stone product comprising a ceramic powder of 25 wt. % to 80 wt. %, a glass sand of 40 wt. % to 70 wt. %, and an adhesive of 1 wt. % to 25 wt. %, based on a total weight of the engineered stone product,
    wherein the ceramic powder comprises aluminum silicate, has a content of aluminum of 10 wt. % to 30 wt. % and an average particle size of the ceramic powder is 8-600 mesh,
    wherein the glass sand comprises silicate having a content of calcium of 0.5 wt. % to 5 wt. % and a content of sodium of 0.5 wt. % to 9 wt. %, an average grain size of the glass sand is 5 to 600 mesh, and
    wherein the adhesive comprises alkyd resin, epoxy resin, acrylic resin, or a combination thereof,
    wherein the engineered stone product does not contain quartz sand.

2. The engineered stone product of claim 1, wherein the ceramic powder comprises kaolinite, metakaolin, spinel, garnet, or a combination thereof.

3. The engineered stone product of claim 1, wherein the silicate contains 0.5 wt. % to 10 wt. % of aluminum.

4. The engineered stone product of claim 1, wherein the average particle size of the glass sand is 5 to 150 mesh.

5. The engineered stone product of claim 1, wherein a content of the adhesive is 7 wt. % to 15 wt. %.

6. The engineered stone product of claim 1, comprising at least one decorative additive.

7. The engineered stone product of claim 6, wherein the decorative additive comprises one or more selected from a colored pigment, a reflective material, and an aggregate.

8. The engineered stone product of claim 7, wherein the coloring pigment is selected from titanium dioxide, iron oxide pigment, phthalocyanine blue pigment, pearlescent pigment, azo pigment, mirror pigment, and combinations thereof.

9. The engineered stone product of claim 1 is capable of being polished to a gloss of at least 20°.

10. The engineered stone product of claim 1, having a Mohs hardness of greater than 5.

11. The engineered stone product of claim 1, having a water absorption of less than 0.03%, measured according to ASTM C97/C97M-18.

12. The engineered stone product of claim 1, having a density of from 2000 kg/m$^3$ to 3500 kg/m$^3$.

13. The engineered stone product of claim 12, having a density of 2500 kg/m$^3$.

14. The engineered stone product of claim 1, having a wear resistance of greater than 36, measured according to ASTM C241/C241M-15.

15. The engineered stone product of claim 1, having a fracture modulus of at least 32 MPa, measured according to ASTM C99/C99M-15.

16. The engineered stone product of claim 1, having a bending strength of at least 26 MPa, measured according to ASTM C880/C880M-15.

17. The engineered stone product of claim 1, wherein, according to ASTM C650-04, the engineered stone product is not affected by chemical substances.

18. The engineered stone product of claim 1, wherein, according to ASTM C241-15, the engineered stone product is pollution resistant.

19. A method for manufacturing the engineered stone products according to claim 1, comprising: mixing the ceramic powder, the glass sand, and the adhesive to form a mixture; compressing the mixture to form a compressed mixture; and solidifying the compressed mixture to form the engineered stone products, and
    wherein compressing the mixture to form the compressed mixture is carried out by vibration compression under vacuum condition of about −0.1 MPa, and the compressed mixture is solidified at 85° C. to 110° C.

20. The engineered stone product of claim 1, wherein the sand glass comprises sodium of 8.0 wt. % to 9.0 wt. %, silicon of 27 wt. % to 28 wt. %, and calcium of 4.0 wt. % to 5.0 wt. %.

21. The engineered stone product of claim 20, wherein the sand glass further comprises 2.0 wt. % to 3.0 wt. % of magnesium.

* * * * *